United States Patent
Miliefsky et al.

(10) Patent No.: US 9,911,006 B2
(45) Date of Patent: Mar. 6, 2018

(54) SECURING DATA GATHERING DEVICES OF A PERSONAL COMPUTING DEVICE WHILE PERFORMING SENSITIVE DATA GATHERING ACTIVITIES TO PREVENT THE MISAPPROPRIATION OF PERSONAL USER DATA GATHERED THEREWITH

(71) Applicant: NETSHIELD Corporation, Nashua, NH (US)

(72) Inventors: Gary S. Miliefsky, Nashua, NH (US); Ken Lichtenberger, Nashua, NH (US); Christopher P. Gauthier, Nashua, NH (US)

(73) Assignee: NETSHIELD Corportation, Nashua, NH (US)

( * ) Notice: Subject to any disclaimer, the term of this patent is extended or adjusted under 35 U.S.C. 154(b) by 0 days.

(21) Appl. No.: 14/960,780

(22) Filed: Dec. 7, 2015

(65) Prior Publication Data
US 2016/0203326 A1 Jul. 14, 2016

Related U.S. Application Data

(63) Continuation of application No. 14/596,028, filed on Jan. 13, 2015, now Pat. No. 9,208,349.

(51) Int. Cl.
*G06F 21/62* (2013.01)
*G06F 21/57* (2013.01)
*G06F 21/60* (2013.01)

(52) U.S. Cl.
CPC .......... *G06F 21/629* (2013.01); *G06F 21/577* (2013.01); *G06F 21/602* (2013.01); *G06F 2221/034* (2013.01)

(58) Field of Classification Search
CPC .... G06F 21/629; G06F 21/577; G06F 21/602; G06F 2221/034
See application file for complete search history.

(56) References Cited

U.S. PATENT DOCUMENTS

| 5,671,442 A | 9/1997 | Feeney et al. |
| 6,189,050 B1 | 2/2001 | Sakarda |

(Continued)

FOREIGN PATENT DOCUMENTS

| EP | 1655899 A1 | 5/2006 |
| EP | 1890427 B1 | 10/2009 |

(Continued)

OTHER PUBLICATIONS

Liang Cai et al. (Defending Against Sensor-Sniffing Attacks on Mobile Phones, 6 pages, Aug. 17, 2009).*

(Continued)

*Primary Examiner* — Oleg Korsak
(74) *Attorney, Agent, or Firm* — Finch & Maloney PLLC

(57) ABSTRACT

A functional library can secure data gathering devices of a personal computing device on behalf of a secure application program to provide a more secure computing session during which sensitive data gathering activities are performed using any of those data gathering devices. The functional library, when incorporated within a personal computing device, creates a secure personal computing device on which to execute application programs such as mobile banking applications. The secure functional library acquires exclusive access to one or more of a predetermined plurality of the data gathering devices on behalf of a calling secure software application. Exclusive access is achieved by gaining access to each of the predetermined set and then locking that access throughout either the entire computing session, or at least until the execution of sensitive data gathering activities being performed during that computing session have been completed. The data gathering devices to be included in the predetermined set can be those that are deemed particularly vulnerable to exploitation in view of the types of sensitive data gathering activities to be conducted, or simply all of (Continued)

them for maximum security. The predetermined set can be defined and set for a particular application, or they can be defined more generally within the context of specific sensitive tasks or activities to be conducted.

15 Claims, 6 Drawing Sheets

(56) References Cited

U.S. PATENT DOCUMENTS

| | | | |
|---|---|---|---|
| 6,314,409 | B2 | 11/2001 | Schneck et al. |
| 7,310,664 | B1 | 12/2007 | Merchant et al. |
| 7,353,538 | B2 | 4/2008 | Sample |
| 7,424,030 | B2 | 9/2008 | Subramanian et al. |
| 7,739,693 | B2 | 6/2010 | Bernhard et al. |
| 8,140,664 | B2 | 3/2012 | Huang et al. |
| 8,271,642 | B1 | 9/2012 | Sankararaman et al. |
| 8,554,748 | B1 | 10/2013 | Kamity et al. |
| 8,566,924 | B2 | 10/2013 | Bacastow |
| 8,590,033 | B2 | 11/2013 | Schleiss et al. |
| 8,595,489 | B1 | 11/2013 | Faaborg et al. |
| 8,650,620 | B2 | 2/2014 | Chawla et al. |
| 9,208,349 | B1 | 12/2015 | Miliefsky et al. |
| 2003/0051169 | A1 | 3/2003 | Sprigg et al. |
| 2003/0084340 | A1 | 5/2003 | Schertz et al. |
| 2003/0131256 | A1 | 7/2003 | Ackroyd |
| 2004/0003290 | A1 | 1/2004 | Malcolm |
| 2005/0005169 | A1 | 1/2005 | Kelekar |
| 2006/0200471 | A1 | 9/2006 | Holland et al. |
| 2006/0253712 | A1 | 11/2006 | Armingaud et al. |
| 2007/0038997 | A1* | 2/2007 | Grobman .............. G06F 21/10 718/1 |
| 2007/0199075 | A1 | 8/2007 | Skoric et al. |
| 2009/0106834 | A1 | 4/2009 | Borzycki et al. |
| 2009/0265754 | A1* | 10/2009 | Hinds .............. G06F 21/6218 726/1 |
| 2010/0197290 | A1 | 8/2010 | Luzzatto |
| 2011/0138186 | A1 | 6/2011 | Jourdain et al. |
| 2011/0239306 | A1 | 9/2011 | Avni et al. |
| 2012/0054868 | A1 | 3/2012 | Ramalingam |
| 2012/0110666 | A1 | 5/2012 | Ogilvie |
| 2012/0159578 | A1 | 6/2012 | Chawla et al. |
| 2012/0222120 | A1 | 8/2012 | Rim et al. |
| 2012/0240236 | A1 | 9/2012 | Wyatt et al. |
| 2012/0317609 | A1 | 12/2012 | Carrara et al. |
| 2013/0054962 | A1 | 2/2013 | Chawla et al. |
| 2013/0055347 | A1 | 2/2013 | Chawla et al. |
| 2013/0212677 | A1 | 8/2013 | Wurster |
| 2013/0297836 | A1 | 11/2013 | Bhesania et al. |

FOREIGN PATENT DOCUMENTS

| | | |
|---|---|---|
| WO | 2013022655 A1 | 2/2013 |
| WO | 2014154323 A1 | 10/2014 |

OTHER PUBLICATIONS

Liang, Cai et al., "Defending Against Sensor-Sniffing Attacks on Mobile Phones", MobiHeld'09, Aug. 2009, pp. 31-36.
PCT Search Report and Written Opinion for PCT Application No. PCT/US2016/013155, 13 pages.
Cisco adaptive security device manager version 5.2 Data Sheet, Cisco Systems, Inc. 2008, http:www.cisco.com/c/en/us/products/collateral/security/pix-500-series-security-appliances/product_data_sheet0900aecd804ba978.pdf, see pp. 1-2.
SECUDRIVE Device Control Enterprise manual, Brainzsquare, Jul. 12, 2012, http://download.secudrives.com/sddce/1.0/kr/sddce20.pdf, see pp. 3-4, 8, 15, 18-19.
International Search Report and Written Opinion received for PCT Application No. PCT/US2013/043240. dated Sep. 6, 2013. 15 pages.

* cited by examiner

SECURING DATA GATHERING DEVICES OF A PERSONAL COMPUTING DEVICE WHILE PERFORMING SENSITIVE DATA GATHERING ACTIVITIES TO PREVENT THE MISAPPROPRIATION OF PERSONAL USER DATA GATHERED THEREWITH

RELATED APPLICATIONS

This patent application is a continuation and claims benefit of U.S. application Ser. No. 14/596,028, filed Jan. 13, 2015, titled, SECURING DATA GATHERING DEVICES OF A PERSONAL COMPUTING DEVICE WHILE PERFORMING SENSITIVE DATA GATHERING ACTIVITIES TO PREVENT THE MISAPPROPRIATION OF PERSONAL USER DATA GATHERED THEREWITH, which is hereby incorporated herein by reference in its entirety.

FIELD OF THE INVENTION

This application relates generally to preventing breaches in security while executing various activities of a sensitive nature during a computing session using a personal computing device, and more particularly to securing data gathering devices, installed on the personal computing device, to prevent theft of personal data through the exploitation of these devices while executing sensitive activities using the personal computing device.

BACKGROUND OF THE INVENTION

Software programs have been developed in the past to provide security for computing sessions during which tasks are executed by computing devices that involve the gathering and use of a user's personal information. For example, computer systems have been developed whereby a user can access a system through a computing device, by which to engage in self-service banking activities. These sessions typically include a log-in process at the onset of the computing session, during which a user is required to input credentials into the system that the system can use to verify the identity of the user and then authorizing the user to access sensitive information from the system based on this verification. Sensitive personal banking information can include stored bank account data maintained for that user by her bank.

The development of self-service banking technologies originated with the development of automated teller machines (ATMs) in the late 1960s. These specialized computing devices made it possible for customers of banks to perform personal transactions with their banks electronically virtually twenty-four hours a day, and seven days a week. At first, these ATMs were directly coupled to the customer's physical bank branch. In short order, they became highly interconnected through intra-bank networks, and then through interbank networks that now permit customers to perform such transactions from any ATM around the world. Thus, customers can perform various activities involving the exchange of highly sensitive and personal banking information with their respective banks, such as withdrawing and depositing funds, making account balance inquires and transferring funds between the customer's various accounts. Notwithstanding the convenience of such commercial terminals, users must still physically travel to an ATM location, and must share those specialized computing terminals with other users.

With the advent of personal computers and the Internet, financial institutions began providing secure web sites with which customers could interact over the Internet through a browser program executed on a customer's personal computer. This technology enabled customers to perform many of the same types of banking transactions from their home or office, using a personal computer, that they were previously performing using an ATM. Such activities include making balance inquiries, viewing monthly statements and summaries of transactions, and even paying their bills through the electronic transfer of funds.

The convenience of online banking has been further increased with the explosion of free public access Wi-Fi Internet hotspots, now physically located in all types of businesses that are open to the public. These hotspots make it possible for bank customers, various mobile personal computing devices, to conduct sensitive banking activities over the Internet from hotels, restaurants, grocery stores, cafes, malls, airports, etc.

Perhaps the biggest revolution in self-service electronic banking has come about only recently, with the now nearly ubiquitous availability of affordable smartphones. Smartphones are capable of running sophisticated software applications such as banking applications, and can reach the Internet through the aforementioned public wireless hotspots, as well as through the mobile telephone network to which the user is subscribed. As a result, customers are now able to access their bank to conduct highly sensitive and personal banking activities, including using the smartphones to sense and gather sensitive personal data for purposes such as depositing physical checks, from virtually anywhere in the world.

While convenience to the user has greatly increased in direct relation to the degree to which they have become increasingly untethered from their physical banks, their vulnerability to those who would seek to steal their money and their sensitive personal information has increased commensurately. While the security of ATMs has been successfully breached in numerous ways, including physical attacks on users late at night, card skimming and shoulder surfing, sensitive banking activities conducted through ATMs are still not as vulnerable as when those activities are performed using personal computing devices. This is largely because ATMs have been historically provided either by the banks themselves, or by trusted third party vendors, and thus the user cannot easily alter the software running on ATM machines. Moreover, because the ATM is not operationally mobile, the link that couples it to the ATM network is dedicated and hardwired to the banking network. This close-coupling and control of ATMs makes this type of computing device relatively secure. Owners of personal computing devices such as smartphones, however, are able to easily access or otherwise alter the operational state of the ATM in many ways. For example, users are able to choose from and download to their personal computing devices a myriad of software applications available from third party developers.

The use of personal computers (PC) for home banking marked the advent of using computing devices owned and controlled by the users themselves, and not the banks, to connect to the banking system and perform sensitive activities. Because the user's bank is not able to control what additional software is loaded onto each user's PC, whether the user is using a secure firewall or an anti-virus software program, on what links the user clicks, or what emails a user opens, the potential for compromising the integrity of the device connecting to the bank's system is so much greater when the computing device used is owned and controlled by the user. Moreover, the use of unsecure public Wi-Fi hotspots with laptops, notebooks and tablet computing devices, as well as the use of near-field wireless device connections such as Bluetooth and NFC, has further opened up secure computing activities such as mobile banking to proximity attacks as well.

But it is the more recent explosion in the use of smartphones for performing sensitive tasks such as mobile banking that has created a veritable avalanche in potential security attacks during the performance of such sensitive activities. First, like the other forms of personal computing devices discussed above, they are owned by, and therefore under the complete control of, the user. Second, the user is free to download virtually unlimited types of software apps and services, mostly developed sold by third party vendors. These apps can perform any number of tasks such as, for example, playing games like Angry Birds, turning on the LED flash of a smartphone's camera for use as a flashlight, and even providing different forms of keyboards that the user finds more desirable than the keyboard provided with the smartphone as purchased. Finally, it is the availability of various data gathering devices installed on smartphones such as cameras, microphones, GPS locating devices, scanning device drivers, port drivers such as USB, as well as proximity interfaces such as Bluetooth and NFC (near field communication chips) that are being used to sense and gather sensitive personal data while executing tasks such as mobile banking, that make personal computing devices such as smartphones so vulnerable to security attacks. These various data gathering devices are often accessible to any software application program or service running on the personal computing device, and that makes them particularly easy to exploit.

FIG. 1A illustrates a high-level representation of a known ATM banking environment 102. The ATM environment 102 is relatively secure. Often, the ATM machine 104 is locked in its own room, and a user must use his/her banking card to gain access to the ATM environment 102 first, with the door locking others from the environment 102 once the user is inside. The ATM environment 102 commonly includes a closed circuit television (CCTV) camera 118 that permits real time and stored monitoring of the entire ATM environment 102. A visible and/or audio alarm 116 is also sometimes provided.

Another camera 106 is also typically provided to capture image data of the user during each transaction. The ATM 104 commonly includes a display 110, a keyboard 108 through which users provide credentials and make menu selections shown on display 110, a card reader 112 for reading the user's personal debit and/or credit card, and cash and receipt dispenser 114. Newer ATMs may also include scanners for reading cash and checks for deposit.

ATM 104 is then typically coupled, through a dedicated link 120, directly to the servers of the data center 122 serving bank 124. Those of skill in the art will appreciate that ATM 102 is directly and physically coupled to the bank data center 122 through dedicated link 120, and it is relatively difficult to hack for purposes of intercepting a user's secure banking transaction data when it is being transmitted between the ATM 104 and the bank data center 122. The software operating system is not readily accessible to a user, so the user is not able to download or install software that may corrupt the secure operating state of the ATM machine.

Thus, sensor devices of the ATM 104, such as camera 106 and/or a deposit scanner 114 as previously discussed, as well as keyboard 108, card reader 112 and display 110 are all under the control of relatively fixed ATM software (the typical user does not have any easy way to alter the software running on the machine). Therefore, it less likely that the information collected by these data gathering sensor components will be intercepted by corrupted software running on the ATM 104. While not as secure as working directly with an employee of a bank in person, the ATM 104 provides a relatively safe and secure system through which to engage in personal banking transactions.

The security risks that are present for mobile banking transactions using personal computing devices such as tablets and smartphones are potentially far more insidious and difficult to control. FIG. 1B represents a high-level illustration of an example of a current mobile banking infrastructure. A user's smartphone 152 is coupled to the bank data center 122 over the Internet 164 via the smartphone's Wi-Fi connection 160 and/or the 3G/4G telephone network 162, to which the user subscribes. With reference to the front view 152a of smartphone 152, an unsecure banking software application 150 is stored on smartphone 152. The unsecure software banking "app" 150 is launched by the user and executed by the smartphone 152, to initiate what the user and the bank 124 believe to be a secure computing session for purposes of engaging in sensitive banking transactions.

Unsecure banking application 150 establishes connectivity with the bank data center 122 using either Wi-Fi connection 160 or telephone network 162, and prompts the user through display 154 to enter user credentials (e.g. user ID and password) using displayed keyboard 156. Once the user credentials are verified and the user is logged into the bank data center 122, the unsecure banking app 150 presents a menu of options to the user on the display 154, by which the user may engage in self-service banking activities with the bank data center 122 of the user's bank 124. These activities will likely involve the gathering and transfer of sensitive and personal information between the smartphone 152 (or other personal computing device) and the bank data center 122.

The primary difference between the ATM banking system of FIG. 1A and the mobile banking system of FIG. 1B is that, unlike the ATM terminal 104, the mobile smartphone 152 is owned and controlled by the user. The user's smartphone is loaded with a large number of other software apps 166 that were either provided with the smartphone 152, or that were downloaded and stored on the smartphone 152 by the user.

These software apps 166 are often developed, not by the suppliers of smartphones, but by independent developers through API's provided by the phone suppliers. Some quality and security control is attempted by the phone suppliers to ensure that these software apps are legitimate and non-malicious. For example, they may require pre-approval of each developer, and may require that such applications be sold through a pre-approved distribution web site such as the Google Play store (for applications running on smartphones using the Android operating system (OS)). The applications can be digitally signed to ensure authenticity.

But even these measures fall far short of ensuring that such software applications are not performing malicious actions under the cover of being a legitimate software application. Moreover, smartphones can be hacked or jail-broken with the knowledge and participation of the user to permit the downloading of pirated copies of the software applications. A user may opt for such bootleg copies to avoid paying full-price for the application, or to expand the functionality of the smartphone beyond what would otherwise be permitted by the original state of the smartphone when purchased.

Software apps can be written to freely access the various data gathering devices of the smartphone 152 through the device drivers for those devices. Access to these devices can be made without the knowledge of the user. The app may have legitimate need to access devices in carrying out its apparent and advertised purpose, or may have no legitimate need for access to such devices. Data gathering devices can include, for example, cameras 158 and 170 for sensing and gathering image information, microphones used for sensing and gathering sound data such as speech (not shown), GPS locating devices for gathering coordinate data used to geo-locate the phone using satellites, device drivers for data gathering devices such as scanners and USB ports, etc. Near field communication devices such as NFC and Bluetooth are also used to sense and gather personal information, such as for purposes of making payments through proximity with point of sale terminals.

These apps can also be maliciously programmed to connect to the Internet, to access sensitive personal data such as contacts and pictures, and they can be programmed to intercept keystrokes on the keyboard and to take screen shots to scrape data from the display of a personal computing device such as a smartphone. Moreover, because most operating systems permit multiple apps and services to exist simultaneously, many applications and services are able to run in the background even while a sensitive app, such as a mobile banking application, is running in the foreground. Background apps and services may be suspended while the foreground application is being executed, but they can be waiting in the wings for the first opportunity to force themselves to the foreground and become active once again.

The detection of software applications malicious intent is difficult, because there are many legitimate apps accessing the various sensors, drivers and services of the personal computing device. Thus, what might appear on the surface to be a legitimate flashlight application for example, and which may function perfectly as a flashlight app, may also be capable of accessing the microphone, or one or all of the cameras for purposes of eavesdropping on the user's activities, without the user ever realizing it until it's too late. Because software apps 166 can also be legitimately programmed to access the Internet 164 through Wi-Fi connection 160, they can also be programmed to send sensitive information, captured through eavesdropping activities, over the Internet 164 to some undisclosed site for malicious purposes such as identity theft, theft of passwords and theft of funds.

Those of skill in the art will recognize that this vulnerability is particularly severe for smartphones and other personal computing devices that employ a multi-threaded operating system (OS), which allows many applications to run concurrently. All mobile operating systems are multi-threaded to some degree, because the ability to run applications concurrently in the background is particularly desirable in personal computing devices such as smartphones. Such functionality allows the phone to perform functions in the background, such as polling the user's email server or displaying the current weather conditions, or alerting the user to the arrival of new email or a text, for example, while the user may be running a mobile banking application in the foreground.

One verified and demonstrated example of an application running in the background and using a data gathering device to steal a user's sensitive banking information during a mobile banking session, established through user's execution of an unsecure mobile banking application 150 using a personal computing device, is the theft of a check for deposit. In this case, a user launches a banking application on the user's smartphone 152, which connects to the data center 122 of the user's bank 124 as illustrated in FIG. 1B. The unsecure banking app 150 can display a link to the user (not shown) that when activated by the user, initiates the check deposit process. Depositing a check during a mobile banking session is typically accomplished by using the smartphone camera 170 to capture an image of the check, which the smartphone 152 then transmits to the data center 122 over the Internet 164 using either the Wi-Fi 160 or the 3G/4G 162 network connections. The unsecure banking app 150 typically instructs the user to place the check on a flat surface, and to indicate when the user has placed the check within the viewed frame of the camera 170. In response to the user being ready, the unsecure software app 150 requests access to the camera 170, captures an image of the check and then releases the camera 170 for use by other applications 166.

If one of the software apps or services 166 running in the background concurrently with the unsecure banking app 150 is intent on stealing checks intended for deposit, the application 166 can first be written to observe that the unsecure banking application 150 is actually running in the foreground while the malicious app 166 is running in the background. The malicious one of the apps 166 can be further programmed to determine when the unsecure banking application 150 has requested access to the camera 170 during the banking session, presumably to capture an image of a check or some other sensitive document. Finally, the malicious app of apps 166 further detects the moment the camera 170 is released upon completion of image capture. The malicious application can then immediately grab access to the same camera 170 and capture a second image of the check while the check is still in view of the camera. The malicious app can then access the Internet 164 through Wi-Fi interface 160 or mobile data interface 162 either immediately, or at a later time, and without knowledge of the user, send the image it took of the check to a remote site on the Internet 164. From there, the image can be used for fraudulent purposes such as conversion of the funds. Transactions similar to depositing checks, such as the uploading of gift cards for application to purchases, or capture and uploading of credit card images are also becoming popular and are subject to the same lapses in security, and particularly through a camera installed on the personal computing device.

Although banks are well-aware of the vulnerability of personal computing devices such as smartphones, smartphones now number well over 4 billion world-wide and the owners of these smartphones will continue to demand the convenience of using them to perform mobile banking. In addition, people are increasingly using personal computing devices to perform many other types of sensitive activities. For example, smartphones are now being used to transact payments while acting as digital wallets, where cash and credit card payments can be processed using the smartphone directly through the use of near field technology. These transactions can be performed without the need to physically swipe a credit and/or debit card because the phone stores and transmits this sensitive information to point of sale terminals that are programmed to read this sensitive information being transmitted by the phone.

Additionally, personal computing devices are now being used to capture and store images of important documents such as driver's licenses, social security cards, birth certificates, bank account numbers and credentials, credit cards, and the like, providing back-up in case the physical documentation is lost. Thus, a malicious software application that monitors use of the camera, as described above, could gain access to the camera immediately upon its use and quickly take an image in the hope that sensitive subject matter is still in view of the camera.

SUMMARY OF THE INVENTION

A software product embodiment of the invention secures the data gathering devices of a personal computing device while the personal computing device performs sensitive data gathering activities to prevent misappropriation of personal data gathered using one or more data of the data gathering devices installed on the personal computing device. The personal computing device is configured to execute and thereby perform the sensitive data gathering activities during a secure computing session associated with one or more secure software application programs stored thereon. The computer program product includes computer code that is stored on a non-transitory computer readable medium that is capable of being accessed and executed by the personal computing device, to cause the personal computing device to perform a method. In an embodiment, the method includes acquiring exclusive access, on behalf of one of the secure application programs, to each of a predetermined set of the data gathering devices in response to a call from the secure application program while being executed by the personal computing device.

Acquiring exclusive access further includes requesting access to each of the devices of the predetermined set. Whenever access to each of the predetermined set is not granted after a first request for access, a first request to terminate all other non-secure software applications and services running in the background on the personal computing device is issued. The request for access is then repeated, and if access is still not granted after a least a second request for access, the calling secure program is notified that access to the entire predetermined set has not been acquired. When access is granted to each of the predetermined set, the calling secure application is notified that the exclusive access has been acquired on its behalf. The acquired exclusive access to each of the predetermined set is relinquished when notified by the calling application to do so.

In a further embodiment, when acquisition of exclusive access cannot be performed with system level permission and when exclusive access to the predetermined set is not successfully acquired after at least a second request for exclusive access, acquiring exclusive access further includes issuing a second request to terminate any non-secure applications not terminated in response to the first issued request to terminate and repeating the request for access to each of the predetermined set. If exclusive access to the predetermined set is not successfully acquired after at least a third request for access, notifying the calling software application program that the computing session is not sufficiently secure to perform sensitive data gathering activities.

In another embodiment, the second issued request to terminate is made to the user through a user interface presented to the user on a display of the personal computing device.

In another embodiment, the predetermined set is defined by the calling secure application program.

In a further embodiment, the predetermined set includes at least one camera. In other embodiments, the predetermined set includes a scanner device driver.

In a still further embodiment, each of the predetermined set is provided with a kernel driver for providing access thereto, each kernel driver further including a locking mechanism for locking the access thereto.

In other embodiments, the method includes requesting termination of any non-secure applications and services that were previously terminated and that attempt to re-launch themselves during the secure session.

In some embodiments, the personal computing devices is a mobile smartphone.

In another embodiment, the functional library is shared by the one or more secure application programs stored on the personal computing device.

In another embodiment, the data gathering devices to be included in the predetermined set are chosen by the functional library in view of the calling secure application program. In additional embodiments, at least some of the data gathering devices to be included in the predetermined set can be chosen by the user through a user interface.

In further embodiments, the calling secure software application calls the secure functional library at the outset of the secure computing session, and the acquired exclusive access is relinquished in response to notification by the calling secure application program that the secure computing session is being terminated. In further embodiment, the predetermined set includes all vulnerable data gathering devices installed on the personal computing device.

In other embodiments, the secure software application issues a call to the secure functional library just prior to engaging in data gathering activities, and relinquishes the acquired exclusive access in response to notification from the calling secure application that the data gathering activities are completed.

In other aspects of the invention, an embodiment of a secure personal computing device is capable of securing one or more vulnerable data gathering devices installed thereon while performing sensitive data gathering activities to prevent the misappropriation of personal user data gathered therewith. The personal computing device includes non-transitory memory media for storing software instructions including those of a plurality of non-secure application programs and one or more secure application programs. The personal computing device further includes one or more processing devices for retrieving the software instructions from the memory media and executing them. The data gathering devices are accessible by the plurality of non-secure applications programs and the one or more secure application programs, and the personal computing device is configured to perform the sensitive data gathering actions during a secure computing session under control of one of the one or more secure application programs.

The personal computing device further includes an operating system for controlling the retrieval and execution of software instructions of the non-secure application programs and the at least one secure application program. The operating system includes drivers that control access to the one or more data gathering devices by the non-secure application programs and the one or more secure application programs, and the device drivers configured to permit acquired access to the one or more data gathering devices to be locked to render the acquired access exclusive. The secure personal computing device further includes a secure functional library, stored on the memory media, the secure functional library capable of obtaining exclusive access to a predetermined set of the one or more data gathering devices on behalf of an executing one of the one or more secure application programs when called by the executing one of the secure application programs to do so. The exclusive access is maintained by the secure functional library at least concurrently with the performance of any sensitive data gathering activities performed during the secure computing session associated with execution of the calling secure application. The exclusive access is maintained through the drivers for each of the predetermined set to the exclusion of any non-secure program applications and services running concurrently with the executing secure program application.

In another embodiment, the secure functional library has sufficient system level privilege to terminate all non-secure application programs currently having access to any of the predetermined set for gaining exclusive access on behalf of a calling secure application program.

In still another embodiment, the secure functional library has application level privilege to terminate all non-secure application programs and services currently running in the background to acquire exclusive access to the predetermined set on behalf of a calling one of the secure application programs, and if unable to acquire exclusive access to one or more of the predetermined set, the secure functional library can request that the user terminate active non-secure applications running in the background at the system level, through a user interface presented to the user.

BRIEF DESCRIPTION OF THE DRAWINGS

The following description can be better understood in light of Figures, in which.

DETAILED DESCRIPTION

Figure 1A:
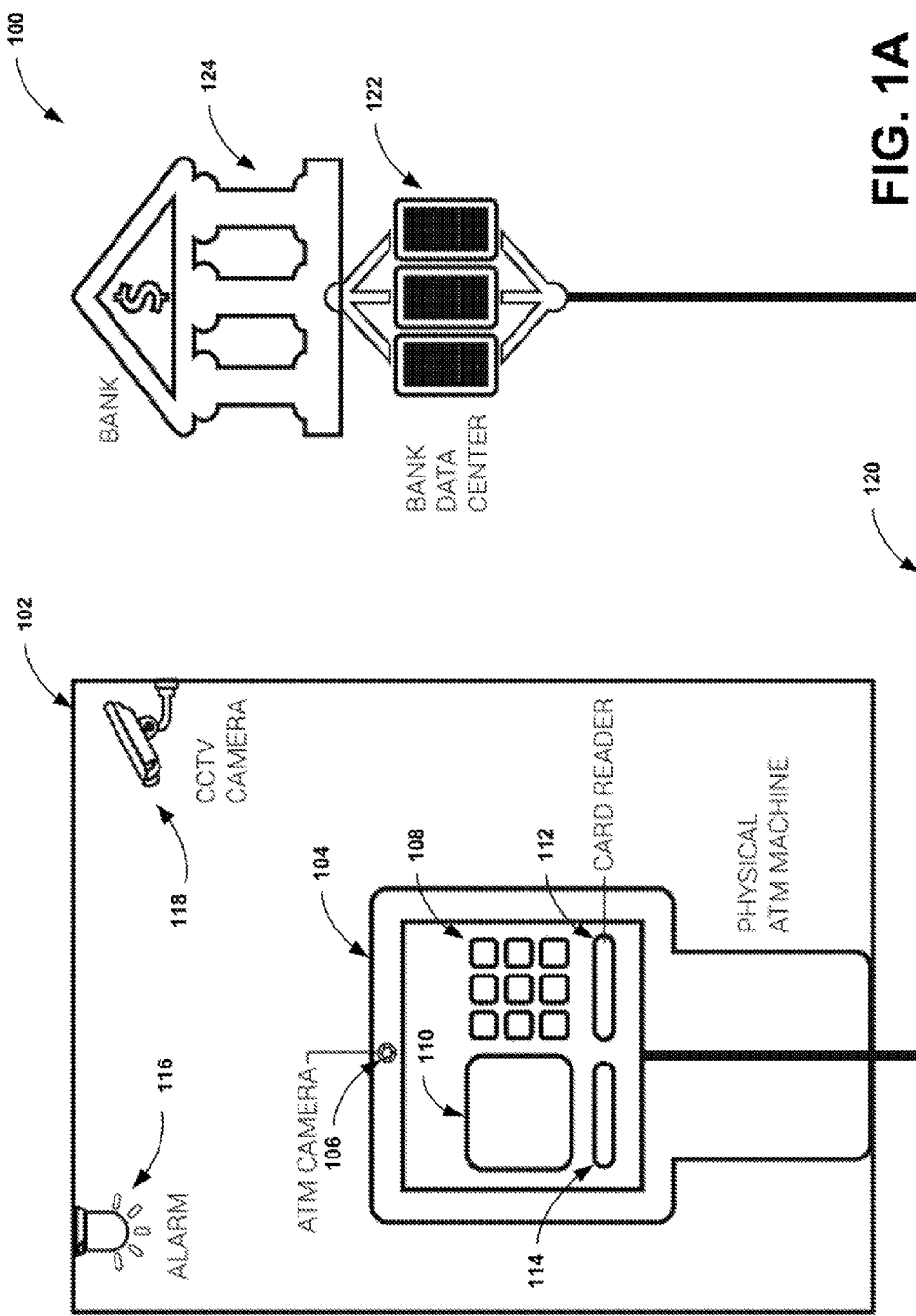
FIG. 1A illustrates a high-level representation of a known ATM banking network.

Various embodiments of a computer software product of the invention, embodiments of a method of the invention executed thereby, and personal computing devices operating under control of the software product of the invention, automatically secure a predetermined set of one or more data gathering devices installed on a personal computing device to secure those devices during the execution of sensitive data gathering activities by the personal computing device. The sensitive data gathering activities can be part of secure computing session, executed by a software application such as a mobile banking app. The personal computing device can be any computing device that executes software applications under control of a user, including personal computers, laptop and notebook computers, tablets and smartphones. The predetermined set of data gathering devices can include any devices, installed on the personal computing device that are capable of sensing or transferring potentially sensitive data that may be the target of misappropriation. Such devices can include for example, cameras, microphones, scanner drivers, Near Field Communication (NFC) readers, GPS locating devices, USB port drivers, Bluetooth transceivers, and the like.

The predetermined set of data gathering devices deemed vulnerable to sensitive activities to be performed by the personal computing device are secured by 1) gaining access to such devices and/or interfaces before permitting the software application to perform the sensitive tasks; and 2) maintaining a lock on that gained access until released, thereby rendering the access exclusive of all other apps and services currently running in the background on the personal computing device, at least until such tasks are completed and the opportunity to steal or otherwise misappropriate sensitive information using those devices has been removed. The set of predetermined devices may be all such data gathering devices installed on the personal computing device, or they may include only those most vulnerable to the type of sensitive tasks to be performed by a particular secure software application.

Embodiments of the software product of the invention can be in the form of a program application (such as a mobile banking app), in which a secure session library of the invention is embedded as computer executable instructions to enhance the security of the specific software app into which it has been embedded. In alternative embodiments, the secure session library of the invention can be implemented as a standalone shared functional library that is stored on the personal computing device and that may be invoked or called by a plurality of secure program applications that are made aware of the existence of the secure functional library. In this way, the secure session library of the invention can be invoked or called to enhance the security of all such software application programs that are provided with the necessary hooks by which to call it at a time when the software app is about to perform or otherwise facilitate sensitive tasks and activities on behalf of a user.

Figure 1B:
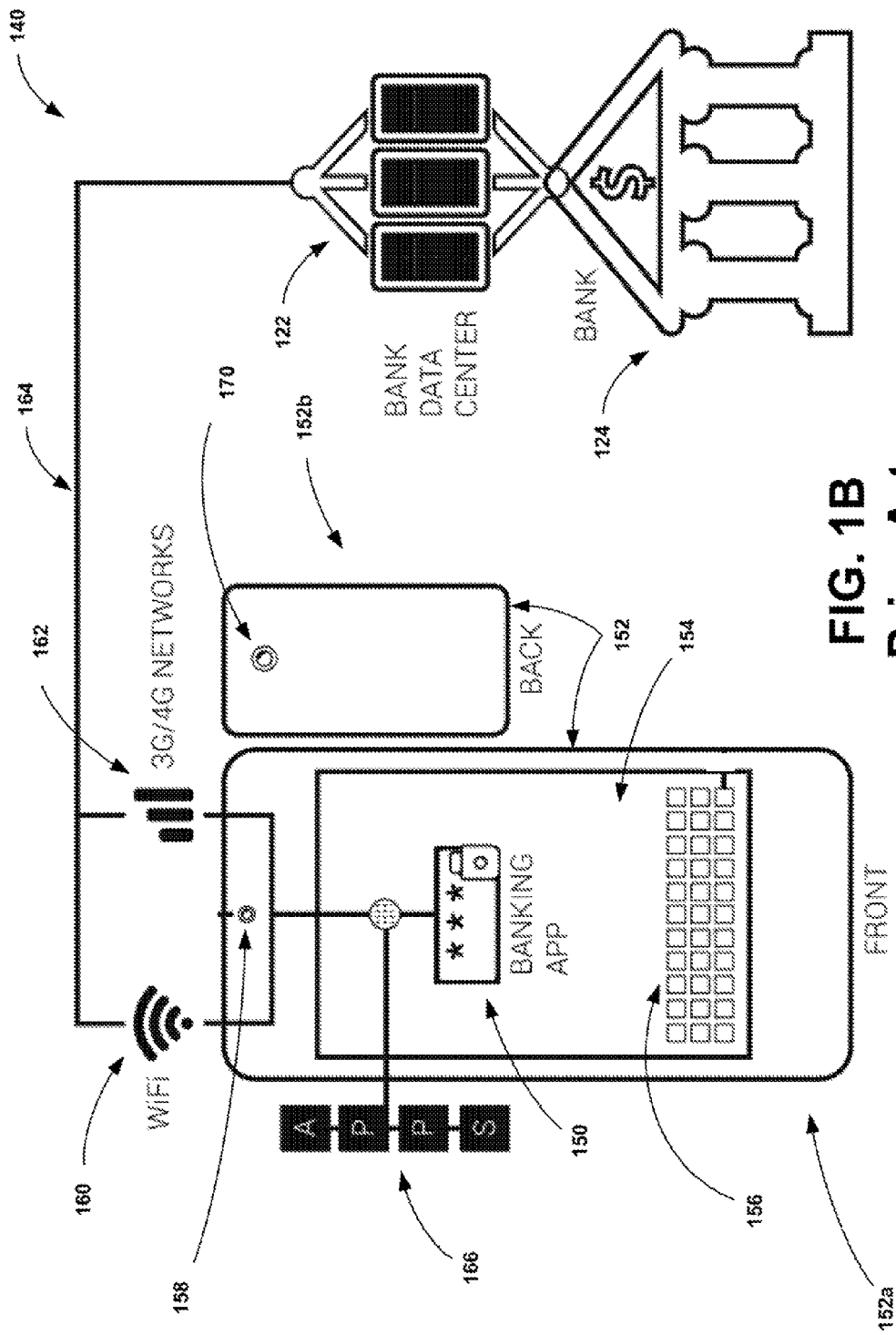
FIG. 1B illustrates a high-level representation of a known mobile banking network.

It will be further appreciated that the computer instructions of the software computer product of the invention can also be made part of a cooperative software system, wherein some of the computer instructions reside in the personal computing device of a user, and some of the instructions can be located within and cooperatively executed by other computing devices such as the servers located in bank data center 122 of FIGS. 1A and 1B. Finally, embodiments of the invention may include personal computing devices in which the computer product of the invention is stored and executed, by which the personal computing device is altered to carry out the method of the invention when the computer product of the invention is executed by the personal computing device.

The software instructions of the computer product of the invention, whether they be subsumed within a software app or separate therefrom, can be downloaded by the user over a network such as the Internet, from the non-transitory memory of a web site and onto the non-transitory memory component(s) of the personal computing device. In the alternative, the software instructions of the computer product of the invention can be loaded onto the personal computing device before it is sold to a user. The computer instructions of the software product of the invention can be loaded onto the personal computing device through a direct physical link to a non-transitory memory storage device containing the software product, such as a USB flash drive.

The computer software product of the invention may be invoked at the outset of initiating computing sessions performing sensitive activities, such as online and mobile banking sessions that may require the use of user credentials for verification before engaging in the sensitive activities. In this way, the entire computing session conducted while executing the software app can be rendered secure against attack, from initiation to termination of that computing session. The computer product of the invention may also be invoked by a program app only at times when the program app is about to perform or facilitate sensitive activities involving sensitive user information (e.g. depositing a check using a captured image of the physical check).

It will be appreciated by those of skill in the art that the latter implementation may be more desirable, as it is less burdensome on the personal computing device's ability to perform legitimate background functions. For example, a user may desire that the user's email server continue to be polled while a mobile banking application is running in the foreground of the personal computing device. In another example, a user may wish to interrupt a sensitive task such as capturing an image of a check, to use the camera sensor to take a picture of some other subject matter.

As previously discussed, one specific example of the vulnerability that is inherent in using personal computing devices such as smartphones as a means for conducting sensitive activities like mobile banking transactions, is the potential for the theft of images of checks for deposit. Because software applications and services 166 can be running in the background in most operating systems installed on such personal computing devices, and because any of those apps or services can be easily programmed to access the sensor devices and other vulnerable device interfaces (e.g. camera 170), such an application or service could be maliciously programmed to observe an unsecure mobile banking software program 150 running in the foreground, and then determine when the unsecure banking app 150 requests access to the camera 170 of the personal computing device (e.g. smartphone 152).

This malicious background process or application program 166 could then be programmed to monitor the camera 170 to determine when the unsecure mobile banking application 150 releases the camera 170 (potentially just after capturing an image of a check for deposit, or possibly some other sensitive document). It can further be programmed to immediately force itself into the foreground just long enough to secure access to the camera 170 for itself, and then capture its own image of the check or sensitive document while it is still in view of the camera 170. The malicious process or program could then establish access to the Internet 164 through the Wi-Fi interface 166 of the computing device 152 and transmit the image data to some remote location so that the funds can be misappropriated using the information gleaned from the image. What makes this process so insidious is that this malicious process can be performed by code embedded in what appears to be an otherwise legitimate app that the user downloaded from an app store. This can be true even though the execution of the app is not affected in any overt way by the malicious code and therefore otherwise operates correctly for its apparent intended purpose.

Various embodiments of the software product of the invention are able to prevent this and other types of "hacks" or unauthorized intrusions, through the exploitation of data gathering devices of a personal computing device that may be exploited as described below.

Figure 2:
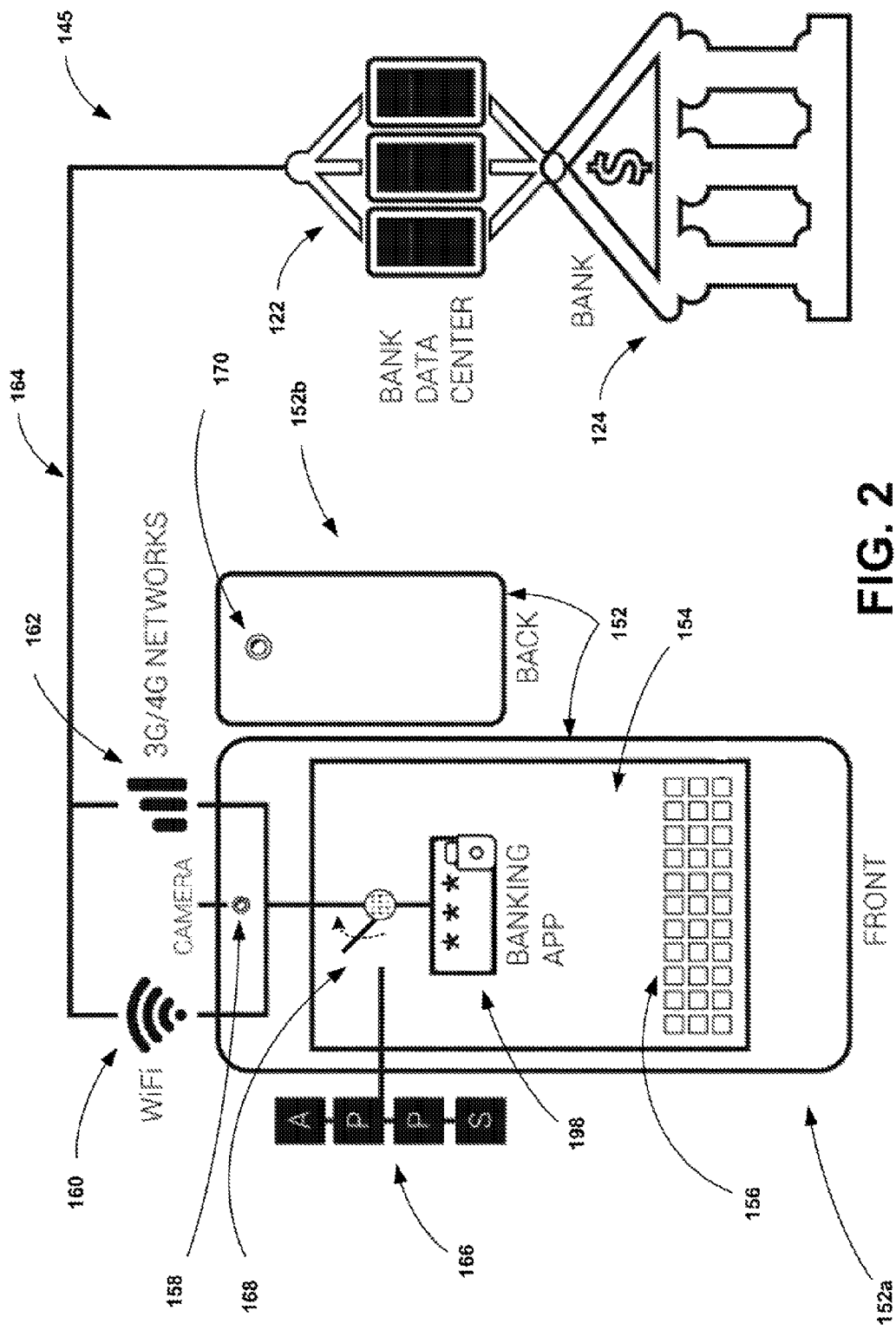
FIG. 2 illustrates a high-level representation of a mobile banking network wherein the personal computing device of the system includes a secure session software product of the present invention stored therein.

FIG. 2 illustrates a high-level representation of a mobile banking system 145, which is accessible through a user's personal computing device, such as smartphone 152. Those of skill in the art will understand that the system of FIG. 2 is virtually identical to the system 140 of FIG. 1B, except that the prior art unsecure banking application (150, FIG. 1B) stored on smartphone 152 has been replaced with a secure session mobile banking software application 198, which can either include instructions of the secure session library computer software product of the invention embedded therein, or which has the ability to invoke the execution of the instructions of the secure session library of the invention in the form of a shared functional library. In the form of a mobile banking application, the secure program application 198 can call the secure session library of the invention at the moment when it is desirable to render secure the mobile banking session executed by the secure program application 198. When the instructions of the computer software product of the invention are executed at the behest of the secure banking application 198, a user's personal computing device such as smartphone 152 can secure a predetermined set of data gathering devices installed on the personal computing device to prevent their exploitation in the misappropriation of the user's personal data gathered by one or more of the predetermined set. This is accomplished through the performance of the procedures such as methods 200, 300 and 400 as illustrated by the procedural flow diagrams of FIG. 3, FIG. 4 and FIG. 5 as will be described below.

Those of skill in the art will recognize that FIG. 2 illustrates a simplistic representation of the network over which a user accesses her bank 124, and is for purposes of illustration only. It will be further appreciated that there are many possible known configurations by which network system components are designed to provide a user with electronic access to a user's banking data over the Internet 164. The details of this subject matter is beyond the scope of the present application. The exact nature of the network configuration is not critical to the operation of the computer product of the present invention, which is intended to provide a secure environment on the user's computing device while engaging in activities between the bank and the user over any of those known network configurations.

Figure 3:
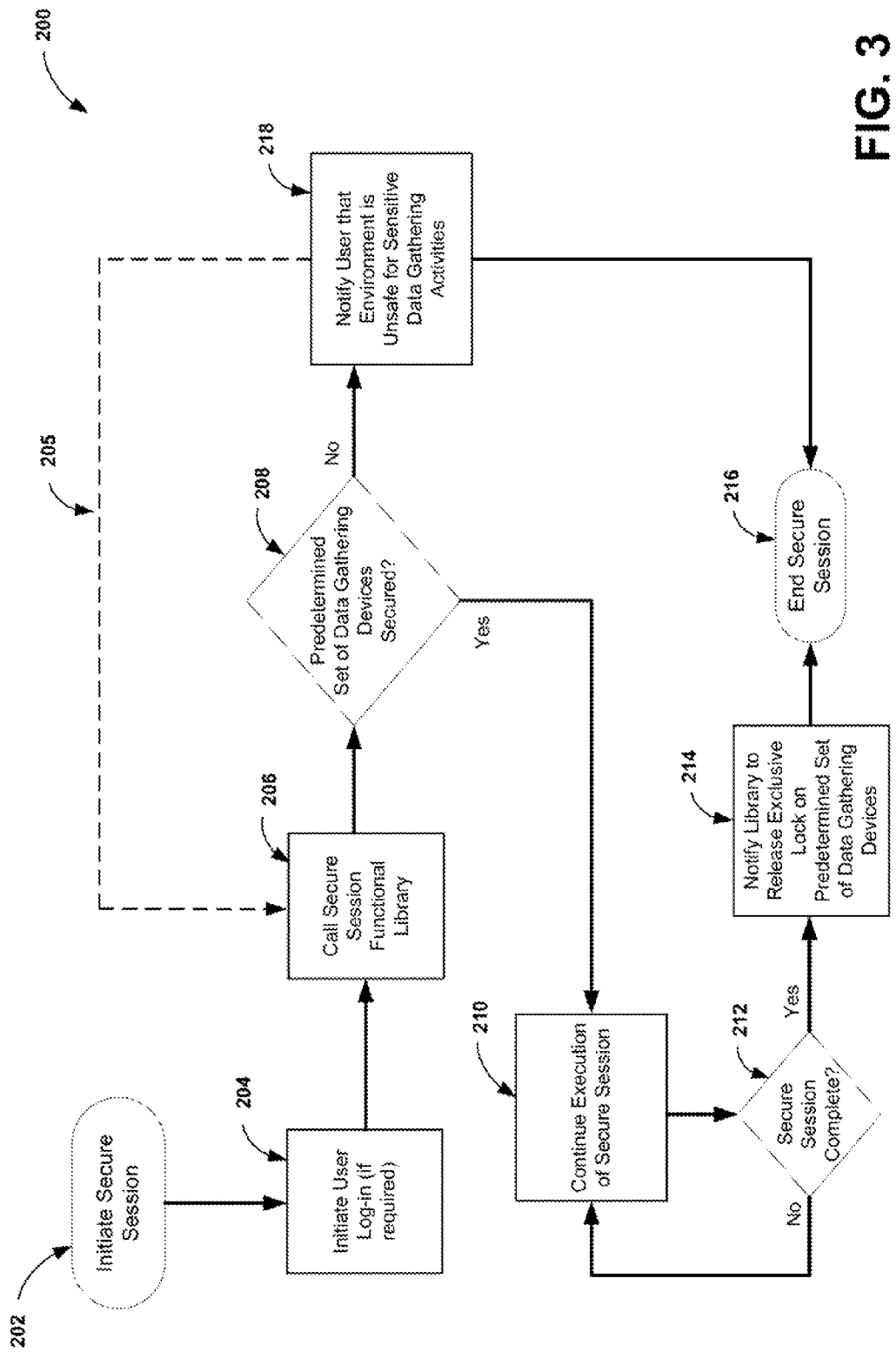
FIG. 3 illustrates a procedural flow diagram of an embodiment of the method performed by the secure session computer program product of the invention, wherein all vulnerable sensor devices are exclusively locked for the entire secure computing session.

FIG. 3 illustrates a procedural flow of an embodiment 200 of a method of the invention that can be performed by a personal computing device (e.g. smartphone) (152, FIG. 2) to secure vulnerable data gathering devices during execution of a secure computing session (e.g. a mobile banking session) produced when executing the software instructions of a software application such as secure mobile banking application (198, FIG. 2). At 202 of FIG. 3, the user initiates a secure computing session by launching the execution of secure mobile banking application 198 by smartphone 152. This mobile banking application can perform or facilitate the performance of sensitive banking transaction activities using the personal computing device, such as for example, depositing checks into the user's bank 124, FIG. 2. Initiation of the secure session software banking application 198 can be accomplished by the user clicking or double clicking on an icon representative of the secure mobile banking software application program 198 through touchscreen display 154.

Once initiated, the mobile banking application establishes a connection between the personal computing device such as smartphone 152, and the bank data center 122, either through Wi-Fi port 160, or through the digital phone network 162 to which the user is subscribed. At block 204, the user may be prompted by the secure session software application, by way of display 154, to enter personal credential information (if required). Such credential information may include a user ID and a password, and may be entered for transmission using displayed touchscreen keyboard 156.

Assuming that the login process is successful (if required), processing continues at block 206, where the secure functional library (401, FIG. 5) is called to establish a secure computing session. Functional library (401, FIG. 5) then seeks to acquire exclusive access to a set of one or more of a plurality of data gathering devices installed on the personal computing device and that have been predetermined to be vulnerable to attack when being accessed in conjunction with the sensitive data gathering activities to be performed by the invoking secure application program. Once access to each of the predetermined set is attained on behalf of the calling secure application program 198, access is locked until such time as the secure session functional library 401 is told to relinquish the acquired exclusive access. The process by which the functional library 401 accomplishes this will be discussed in more detail below with reference to FIG. 5.

Those of skill in the art will recognize that, to create the safest secure computing session possible, it may be desirable to request exclusive access to every data gathering device installed on the personal computing device, through which some non-secure application or service 166 running in the background may possibly obtain sensitive user information during the secure session. However, this may not be practical because users may object to the blocking of non-secure applications or services 166 from those data gathering devices for which those apps have a legitimate need to access. Thus, in an embodiment, the predetermined set of data gathering devices for which demands of exclusive access are made can be limited at the outset to only those devices most likely to be successfully exploited to capture sensitive personal user data during that particular type of secure session.

Those of skill in the art will appreciate that the predetermined set may be established and fixed by the computer program product of the invention on an application specific basis, or it may be at least partially established through a settings interface by the user. Some or all of the data gathering devices may be optionally included in the predetermined set at the discretion of the user, and some or all may be rendered non-optional depending upon the application. As previously mentioned, the most secure environment would be created by including all of the data gathering devices that are potentially vulnerable to attack. Because locking down all of these devices during a computing session such as a mobile banking session may be considered inconvenient, the less vulnerable devices can be omitted from the predetermined set if desired and permitted. For example, one of the advantages of using an operating system that permits multiple processes to run concurrently is that services such as polling the user's email server can continue to run even during a mobile banking session.

In the mobile banking example, at a minimum, exclusive access to camera 170 should be included in the predetermined set because it is now common to use this camera to capture images of sensitive information such as a check for deposit. The camera (170, FIG. 2) typically used for this purpose is often located on the back side 152b of smartphone 152, and is the one also typically used by the user to take pictures generally. Web-cam camera 158, located on the front face 152a of smartphone 152 may also be included in the predetermined set, even though it is typically intended to be used for video conferencing; it is still possible that a user might inadvertently place sensitive information within the frame of web-cam 158 during a mobile banking session.

If it is determined at decision block 208 that notification has been received from the secure session library of the invention that access to the predetermined set of data gathering devices has been acquired, processing continues at 210 where the user interacts with the secure computing session, such as conducting mobile banking activities. By seizing and locking down access to the predetermined set of data gathering devices including cameras 158 and 170 at the outset of the secure mobile banking session, any non-secure applications/services 166 that are concurrently running in the background are now essentially blocked from accessing those devices so long as the secure session application 198 is being executed by the smartphone 152. Such activities can include balance inquiries, bill payments, funds transfers, and the depositing of checks. This blocking of the non-secure applications/services 166 from access to the predetermined set is represented by the open switch 168 in FIG. 2.

Figure 5:
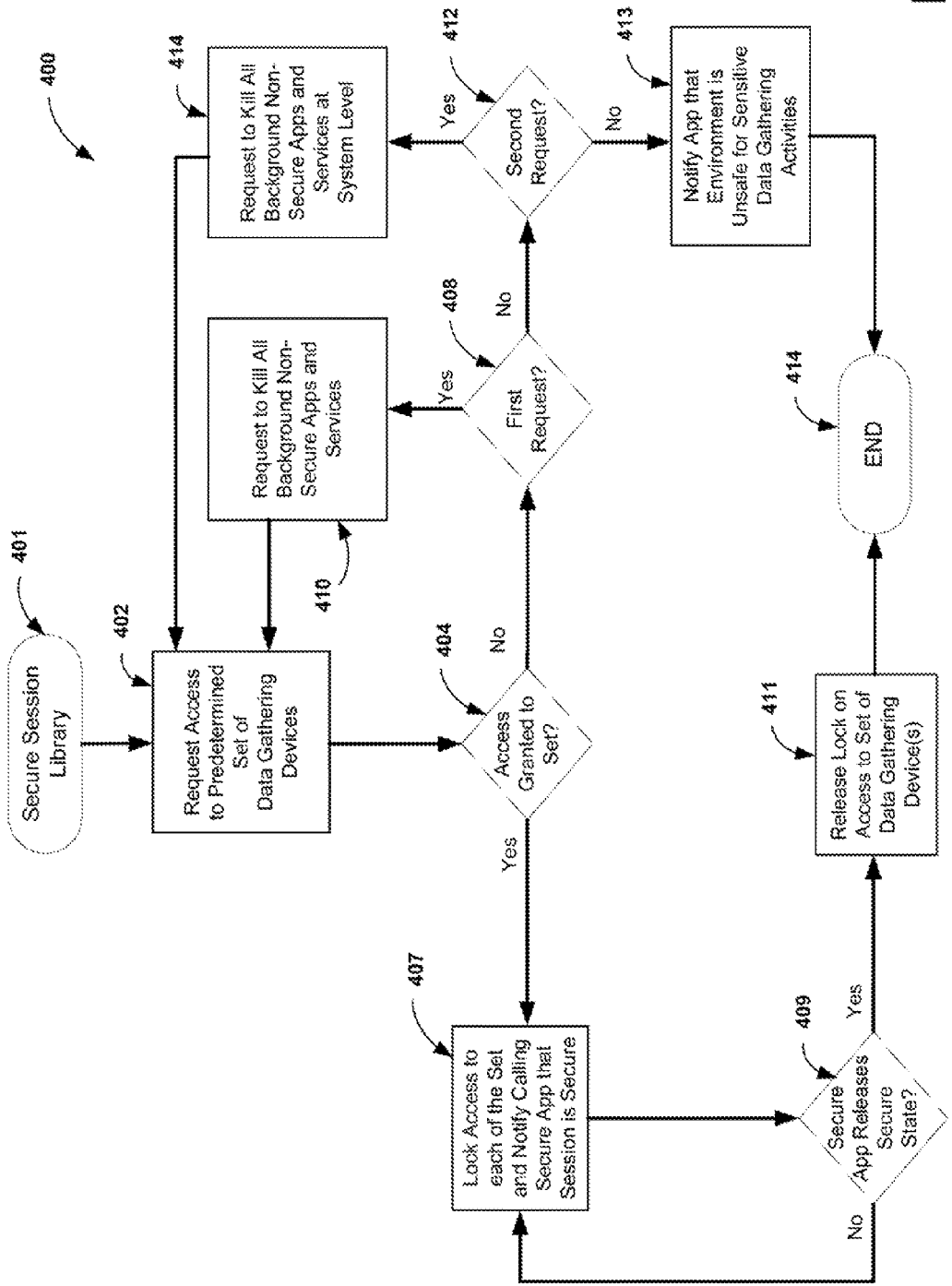
FIG. 5 illustrates a more detailed procedural flow diagram for the secure session functional library of the invention.

Further, the secure session application program of the invention 198 is free to engage in sensitive data gathering activities at any time throughout the remainder of the secure session, as indicated by a "No" output at decision block 212, which feeds back to block 210 as long as the secure session is active. If a "Yes" response is produced at decision block 212 to indicate that the user wishes to end the secure session, or in the event that the secure session times out due to inactivity by the user, processing continues at block 214, where the secure functional library 401, FIG. 5 is instructed by the to release the exclusive access lock on the cameras 158 and 170 (and any other devices included in the predetermined set) and the secure session is terminated at 216.

Because additional non-secure application programs and/or services 166 can be running in the background on smartphone 152, they may request access to the smartphone's 152 data gathering devices at any time during the secure session, and may even be holding access to one or more of those data gathering devices already as the secure computing session is initiated and/or login is being negotiated. If another application or process currently has access to any of the predetermined set for which access has been requested, it will appreciated that such access may not necessarily be granted as long as the current application/process maintains possession of a requested data gathering device. If at decision block 208, a "No" is produced to indicate that exclusive access to the camera(s) 158 and 170 (or any other sensor devices of the predetermined set) has not been acquired, processing continues at 218 where the secure session application program of the invention 198 notifies the user through a message on display 154 that the present software environment of the system is not safe for conducting data gathering activities during the secure session, and the secure session may then terminated at 216.

In the alternative, a message displayed to the user at block 218 that instructs the user to wait until notified to proceed with sensitive data gathering activities, and processing can loop back to block 206 by way of optional path 205 for some predetermined period of time or some number of times before terminating at 216 if a "Yes" is not achieved at decision block 208. Those of skill in the art will appreciate that it may also be possible to force a non-secure application/service 166 to release the requested data gathering device, and this will be discussed below in greater detail in conjunction with the procedural flow diagram of FIG. 5.

It will be appreciated that the embodiment of method 200 illustrated in FIG. 3 is one that secures the predetermined set of data gathering devices for the entire computing session that transpires under the execution of secure mobile banking software application 198. In this embodiment, access to each of the predetermined set is locked down at the outset of the computing session, and this lock on access is maintained until just before the session terminates. When considered in view of the hack previously discussed, where a non-secure application/process 166 running in the background can monitor the activity of the secure banking application 198 and its access to a data gathering device such as a camera 170, it can be seen that a non-secure app that is malicious would be prevented from gaining access to any of the predetermined set of data gathering devices such as camera 170 until long after the user has completed any sensitive data gathering activities associated with mobile banking transactions such as check deposits. As a result, none of the data gathering devices of the predetermined set will be available to a malicious non-secure app for capturing and misappropriating sensitive personal data of the user. Such an app would not be permitted access to any of the predetermined set until the computing session, and any sensitive data gathering activities conducted during the session, have been safely and securely completed, thus rendering the mobile banking session a secure session.

Figure 4:
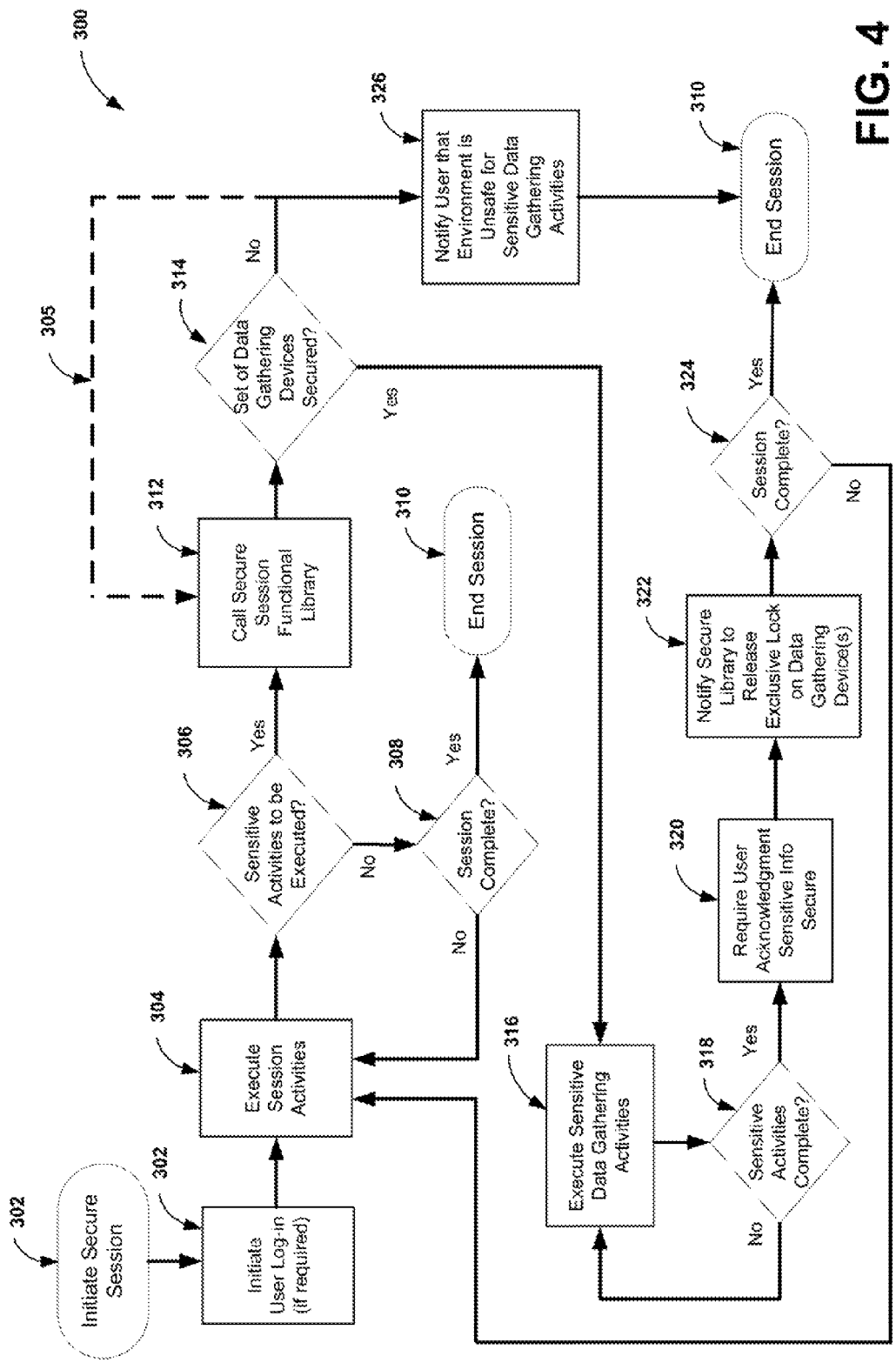
FIG. 4 illustrates a procedural flow diagram of an embodiment of the method of FIG. 3, wherein vulnerable sensor devices are exclusively locked only during the execution and completion of sensitive activities as performed within the secure computing session.

FIG. 4 illustrates an embodiment 300 of a method of the invention that provides security for a computing session performed by a secure application program such as secure mobile banking application (198, FIG. 2), but that only seeks and acquires an exclusive access lock on a predetermined set of one or more data gathering devices at a time just before a sensitive data gathering task or activity is about to be performed using the personal computing device. Once exclusive access to the predetermined set is acquired, the performance of sensitive data gathering activities are permitted using the personal computing device, and the exclusive access is held only long enough to ensure that the sensitive activities have been completed and that all sensitive user information has been safely stowed and placed out of capture range of any of the sensor/transfer data gathering devices of the predetermined set.

With reference to FIG. 4, processing begins at 302 when a computing session is initiated by the user by invoking secure application program (198, FIG. 2) that necessitates the additional security provided by the software product of the invention. If secure software app (198, FIG. 2) is a mobile banking app, it establishes a connection between the personal computing device such as smartphone 152, and the bank data center 122, either through Wi-Fi port 160, or through the digital phone network 162 to which the user is subscribed. Typically, for secure applications such as mobile banking, the user will then be prompted for log-in credentials at block 302, by way of display (154, FIG. 2), and the such credential information (e.g. a user ID and a password) may be entered for transmission using touchscreen keyboard (156, FIG. 2) displayed on touchscreen (154, FIG. 2).

Assuming the log-in process (if required) is successful, processing continues at block 304, where the secure software app (198, FIG. 2) is executed and the user engages in various non-sensitive activities as provided by the computing session as execution of the secure app continues. If secure software app (198, FIG. 2) is a mobile banking app, such activities may include browsing the user's bank statement, etc. If the software app is providing, for example, a shopping and checkout experience, the user may be, for example, adding items to her cart. Decision block 306 represents the secure app 198 monitoring the computing session for selected activity that is known to involve the sensing and/or gathering of sensitive personal user information that may be vulnerable to theft through one or more of the predetermined set of data gathering devices. As long as the answer is "No", the computing session continues until a "Yes" response is generated at decision block 308, where the computing session is terminated at End Session 310. In this case, the computing session may be initiated and ended without ever requiring that exclusive access to the predetermined set of data gathering devices be acquired.

If a "Yes" is generated at decision block 306, processing continues at block 312 where the secure app 198 calls secure session functional library 401, FIG. 5 is invoked. Those of skill in the art will appreciate that the predetermined set of devices can be all of the potentially exploitable data gathering devices regardless of the type of sensitive activity that the computer session is about to execute, or the predetermined set can be customized to each particular type of activity to be executed. Thus, if the activity is going to be a check deposit within a mobile banking app, the predetermined set of sensors may be limited to include one or more cameras of the personal computing device. It will be further appreciated that the predetermined set of vulnerable data gathering devices may also vary from one type of personal computing device to another, depending upon the array of such devices installed on any particular personal computing device being used.

If exclusive access is acquired, thereby securing all vulnerable devices of the predetermined set as indicated by a "Yes" result at decision block 314, processing continues at block 316 where the secure software app (198, FIG. 2) is permitted to execute the sensitive data gathering activities such as capturing an image of a check and performing an upload of the image to the bank data center (122, FIG. 2). Processing continues looping at block 316 at least until the current sensitive activities have been completed, and a "Yes" result is generated at decision block 318. Exclusive access to the predetermined set of data gathering devices is maintained and processing continues at block 320, where an acknowledgement from the user, entered through a user interface, can be required to indicate that sensitive information is no longer capable of being sensed by any of the predetermined set of data gathering devices. For example, this could be an acknowledgment from the user that all physical checks have been put away and out of view from camera (170, FIG. 2). This acknowledgement from the user is optional, and in some embodiments, it can be presumed that such documents are no longer in the view of the camera 170 once the upload of the check image has been completed.

When the acknowledgement has been received at block 320, the secure software app 198 notifies the secure session functional library 401, FIG. 5 to relinquish exclusive access to the predetermined set of sensors at block 322. Processing then continues at decision block 324, where it is determined whether the computing session is complete. If "Yes," the session is terminated at 310. If "No," processing returns to block 304 where the computing session continues as previously described above until the session terminates.

If exclusive access is NOT acquired by the secure session functional library 401 to each of the predetermined set of data gathering devices as determined at block 314, the process can loop through optional path 305 until exclusive access for each of the predetermined set has been acquired as indicated by a "Yes" at block 314, or until some maximum number of attempts or some predetermined time limit has been exceeded without such acquisition. If exclusive access is not acquired for the entire set, processing continues at block 326, where the user is informed that the computing session cannot be made sufficiently safe for performing the sensitive activities. From there, the session is either terminated at 310, or processing is returned to block 304. In some embodiments, while exclusive access to the predetermined continues to be sought, a message may be displayed to the user on smartphone (152, FIG. 2) warning the user NOT to place sensitive documents in view of the camera (170, FIG. 2) until the user is notified by a displayed message on the device that exclusive access has been achieved and that it is safe for the user to proceed with the sensitive activities.

Those of skill in the art will appreciate that the manner of requesting access and locking that access on each of the predetermined data gathering devices can vary between various operating systems, because the kernel drivers for each data gathering device may be implemented differently, and the manner in which access is requested and locked once acquired may also be different. This may also dictate whether the secure library software product of the invention is implemented at the kernel level, or if it is implemented at the application level. At present, some of the above-identified data gathering devices are already provided with the ability for requesting and locking access. For example, cameras typically already have the driver by which to achieve exclusive access. Other data gathering devices may at present require an update to the operating system to provide the ability to lock access to them where none is currently provided. Those of skill in the art will recognize that providing a driver with a lock is a matter of programming the device driver in such a way that it recognizes and grants such a request.

Those of skill in the art will appreciate that embodiments of the methods performed by the secure functional library software product of the invention, as well as secure applications that are programmed to recognize and call the library, are capable of being implemented to operate under any operating system, and those of skill in the art will recognize that the software product of the invention can be adapted to any operating system. In an embodiment that is implemented at the kernel level of the personal computing device, the secure functional library 401 of the invention can potentially be accorded a trusted status that will permit the secure functional library 401 of the invention to have more direct control over the non-secure applications running in the background on the personal computing device. With system level permission, the secure functional library 401 can have the ability to wrest access from, and maintain locked access over, the devices notwithstanding attempts by other applications to seek or maintain access to those sensors. If the software product of the invention is implemented to operate at the application level, its trusted status will be more in accordance with other applications/services running on the personal computing device, and thus the process for achieving exclusive access of the predetermined set of sensor devices can be less forceful.

FIG. 5 illustrates a more detailed flow of the secure functional library 401 of the invention, which illustrates an embodiment that is generally descriptive of most expected implementations. The flow diagram starts at 401, the point where the secure library is called by a secure application such as mobile banking application 198, FIG. 2. As previously discussed, method 200 calls the secure functional library 401 at block 206, FIG. 2 and method 300, FIG. 3 calls the functional library at block 312.

Secure library 401 then requests access to each of the set of predetermined data gathering devices at block 402. Those of skill in the art will appreciate that if the secure functional library 401 of the invention is implemented at the kernel level to have system level permission, a "Yes" at decision block 404 would typically result because this request for access by the secure library should trump access to any of the predetermined already held by any other non-secure application programs. Those of skill in the art will also appreciate that the level of trust that may be accorded to secure functional library 401 may vary with the operating system employed by the personal computing device. Thus, it is possible that even at the kernel level, access to the entire predetermined set may not be granted to the secure functional library 401 on the first request. It is possible that the instantiation of the secure functional library 401 ends up higher on the driver stack than a non-secure app that already has access to one of the predetermined set and thus would be unable to immediately wrest access from the non-secure app. In this case, it would be necessary to notify the user to uninstall or disable the offending driver before proceeding, such as at blocks 218, FIGS. 3 and 326, FIG. 4.

If access is obtained to the entire predetermined set, a "Yes" is generated at decision block 404 and processing continues at block 407, where exclusive access is acquired by locking the acquired access to each of the predetermined set at 407. At 407, the calling secure application is notified that the personal computing device is secured for executing sensitive data gathering activities. Processing continues at 407 so long as the calling secure application is active, looping with decision block 409. As previously discussed, method 200 maintains the secure state of the personal computing device throughout the entire computing session executed by the calling secure application. Method 300 illustrates a calling secure app that only secures the data gathering devices of the personal computing device for the duration of sensitive data gathering activities and relinquishes the secured state after such activities are safely completed.

In both cases, the secure state of the personal computing device is maintained until the calling secure app notifies the secure functional library 401 to relinquish the exclusive access to the predetermined set of data gathering devices at decision block 409 (and thus the secure state of the personal computing device), causing a "Yes" to be generated at decision block 409. Then, processing continues to block 411, where acquired access to each of the predetermined set is unlocked and exclusive access is relinquished. Processing by the secure functional library 401 is then terminated and returned to the calling secure application at 414.

If access is not initially granted to each of predetermined set when access is requested at block 402, then a "No" results at decision block 404 and processing continues at decision block 408, where it is determined if the failure to acquire access to the predetermined set occurs after the first request for access. If the result is "Yes" processing continues at block 410, where the secure functional library 401 issues a request to kill or terminate all non-secure apps/services 166, FIG. 2 that are currently running in the background. Those of skill in the art will appreciate that the request to terminate could be issued for a more limited number of the non-secure applications to be terminated, such as only those that are known to be configured to access one or more of the predetermined set of data gathering devices. This may be desirable to prevent inconvenience to the user by terminating non-secure background apps and services that that the user wishes to have running, and which are not likely to be interfering with the secure functional library's acquisition of exclusive access to the each of the predetermined set. Those of skill in the art will recognize that such discrimination can be performed, but with added complexity and perhaps a somewhat degraded level of security. Those of skill in the art will appreciate that the more broadly directed the request for termination is, the more likely that access can be granted to the entire set of predetermined devices.

Processing then continues again at block 402 once again, where a second request is made for access to the predetermined set. If access is granted after the second request, processing proceeds as described above after a "Yes" result at block 404. If access is still not granted after the second request, this would indicate that the secure functional is likely running at the application level of permission and the termination of some non-secure applications/services cannot be accomplished at the application level of permission. A "No" results at block 408 and processing will continue to decision block 412. A "Yes" result at block 412 causes processing to continue at block 414, where the request to kill or terminate persistent apps/services is elevated to the system level. It will be appreciated that in an embodiment, a system settings dialog box could be presented to the user as part of a graphical user interface (GUI) on the smartphone display, requesting that the user terminate the persistent apps/services manually.

Upon receiving acknowledgement from the user in response to the dialog box, processing will then continue once again at block 404 where a third request for access is made by the secure functional library 401. Should access to any of the predetermined set still not be granted, processing then flows to box 413 where the app is notified that the state of the personal computing device cannot be made sufficiently secure and thus it is not safe to proceed with sensitive data gathering activities and execution of the secure functional library 401 is terminated at "End" 414, and processing returns to the calling secure application program at either 218, FIG. 3 or 326, FIG. 4.

In another embodiment, when processing is at block 407, the secure functional library 401 can monitor for the re-launching of any non-secure applications/services that were previously terminated in the process of gaining exclusive access to the predetermined set of data gathering devices. Any non-secure application/process that continues to re-launch itself can be terminated immediately every time it attempts to re-launch, as that can be considered suspect behavior.

As was previously discussed, the predetermined set of data gathering devices are selected from those installed on the user's personal computing device 152. As previously mentioned, these data gathering devices are assumed to be capable of being locked into an exclusively accessed state by a single application using drivers that are written to provide such capabilities. Drivers can be easily implemented at the operating system level to control access to their respective data gathering devices so that only one application at a time may access the device, and then for an application to lock acquired access until the application relinquishes such access upon completion of its desire for exclusive access. The ability to lock access could be limited to only trusted applications and services, such as the secure functional library 401 of the invention.

The predetermined set may include one or more cameras, microphones, GPS locators, software drivers for scanning devices and USB ports, as well as Near Field and Bluetooth transmitters and/or receivers. To create the most secure environment, any such devices that can potentially be exploited maliciously can be included in the predetermined set. However, it may also be advantageous under certain circumstances to include in the set only those data gathering devices most likely to be so exploited, thereby allowing those devices less likely to be exploited to be free for use by other software applications or services running in the background, while the banking application is executed in the foreground.

While specific examples of misappropriation have been provided herein for image data gathering devices such as cameras and scanner drives, those of skill in the art will appreciate that other clever hacks can be imagined where exploitation of other types of the data gathering devices might be attempted, that can be prevented by the various embodiments of the invention. For example, a malicious one of the non-secure applications/services could turn on the microphone by observing that a user is running a mobile banking application to record speech that may involve sensitive personal information of the user.

It should be noted that it is possible for other secure applications having an awareness of, and ability to call, the secure functional library 401 to be running in the background, and the secure functional library 401 can be configured to recognize the shared level of trust of other secure applications running in the background and permit them to continue running in the background by not including them in the request for termination of non-secure applications and services running in the background at blocks 410 and 414.

It should be further noted that while the procedural flows of FIGS. 3, 4 and 5 are depicted linearly in time, there is no implied limiting of the order of the functions depicted thereby unless expressly stated. For example, secure functional library 401 could request termination of non-secure applications and services running in the background immediately, rather than waiting until a first or second request for access is made.

Finally, the use of the terms secure and non-secure to modify the types of application programs and services running on the personal computing device should be interpreted only to distinguish between those "secure" applications that are configured to be aware of and to call the secure functional library 401 (or that have an instantiation of the functional library 401 embedded within them), and those "non-secure" applications that are not so configured. No other special meaning was intended or implied.

What is claimed is:
1. A personal computing device comprising:
   a camera;
   a memory;
   at least one processor coupled to the camera and the memory;
   a camera driver executable by the at least one processor and configured to acquire exclusive access to the camera for a secure application executing on the at least one processor; and
   a secure functional library executable by the at least one processor and configured to:
      receive, from the secure application, a call to acquire exclusive access to the camera;
      attempt to terminate all non-secure application programs accessing the camera;
      notify the secure application in response to being unable to terminate one or more of the non-secure application programs accessing the camera; and
      in response to being able to terminate all the non-secure application programs accessing the camera:
         acquire exclusive access to the camera via the camera driver in response to receiving the call to acquire exclusive access to the camera from the secure application;

provide the exclusive access to the camera to the secure application;

receive, from the secure application, a call to release the exclusive access to the camera; and release, via the camera driver, the exclusive access to the camera in response to receiving the call to release the exclusive access to the camera from the secure application.

2. The personal computing device of claim 1, wherein the personal computing device includes at least one of a smartphone and a tablet.

3. The personal computing device of claim 1, wherein the secure functional library has system level privilege to terminate all non-secure application programs accessing the camera.

4. The personal computing device of claim 1, wherein the secure functional library has application level privilege to terminate all non-secure application programs accessing the camera.

5. The personal computing device of claim 4, wherein the secure functional library is further configured to notify a user in response to the secure functional library being unable to terminate one of the non-secure application programs accessing the camera.

6. The personal computing device of claim 1, further comprising the secure application.

7. The personal computing device of claim 6, wherein the secure application is a banking application.

8. A method of securing a personal computing device including a camera, the method comprising:

instantiating a secure functional library on the personal computing device;

receiving, by the secure functional library, a call to acquire exclusive access to the camera from a secure application executing on the personal computing device;

attempting, by the secure functional library, to terminate all non-secure application programs accessing the camera;

notifying, by the secure functional library, the secure application in response to being unable to terminate one or more of the non-secure application programs accessing the camera; and in response to being able to terminate all the non-secure application programs accessing the camera:

acquiring, by the secure functional library, exclusive access to the camera via a camera driver in response to receiving the call to acquire exclusive access to the camera from the secure application;

providing, by the secure functional library, the exclusive access to the camera to the secure application;

receiving, by the secure functional library, a call to release the camera from the secure application; and releasing, by the secure functional library via the camera driver, the exclusive access to the camera in response to receiving the call to release the exclusive access to the camera from the secure application.

9. The method of claim 8, wherein instantiating the secure functional library includes instantiating the secure functional library within at least one of a smartphone and a tablet.

10. The method of claim 8, wherein instantiating the secure functional library includes instantiating the secure functional library with system level privilege to terminate all non-secure application programs accessing the camera.

11. The method of claim 8, wherein instantiating the secure functional library includes instantiating the secure functional library with application level privilege to terminate all non-secure application programs accessing the camera.

12. The method of claim 11, further comprising notifying, by the secure functional library, a user in response to being unable to terminate one of the non-secure application programs accessing the camera.

13. The method of claim 8, further comprising instantiating the secure application.

14. The method of claim 13, wherein instantiating the secure application includes instantiating a banking application.

15. A non-transitory computer readable medium storing sequences of instruction for securing a personal computing device including a camera, the computer readable medium comprising instructions configured to instruct at least one processor to:

instantiate a secure functional library;

receive, by the secure functional library, a call to acquire exclusive access to the camera from a secure application executing on the at least one processor;

attempt, by the secure functional library, to terminate all non-secure application programs accessing the camera;

notify, by the secure functional library, the secure application in response to being unable to terminate one or more of the non-secure application programs accessing the camera; and in response to being able to terminate all the non-secure application programs accessing the camera:

acquire, by the secure functional library, exclusive access to the camera via a camera driver in response to receiving the call to acquire exclusive access to the camera from the secure application;

provide, by the secure functional library, the exclusive access to the camera to the secure application;

receive, by the secure functional library, a call to release the camera from the secure application; and release, by the secure functional library via the camera driver, the exclusive access to the camera in response to receiving the call to release the exclusive access to the camera from the secure application.

\* \* \* \* \*